Oct. 25, 1938.    C. F. RAUEN ET AL    2,134,316
AUTOMATIC TRANSMISSION
Filed Aug. 3, 1933    2 Sheets-Sheet 2
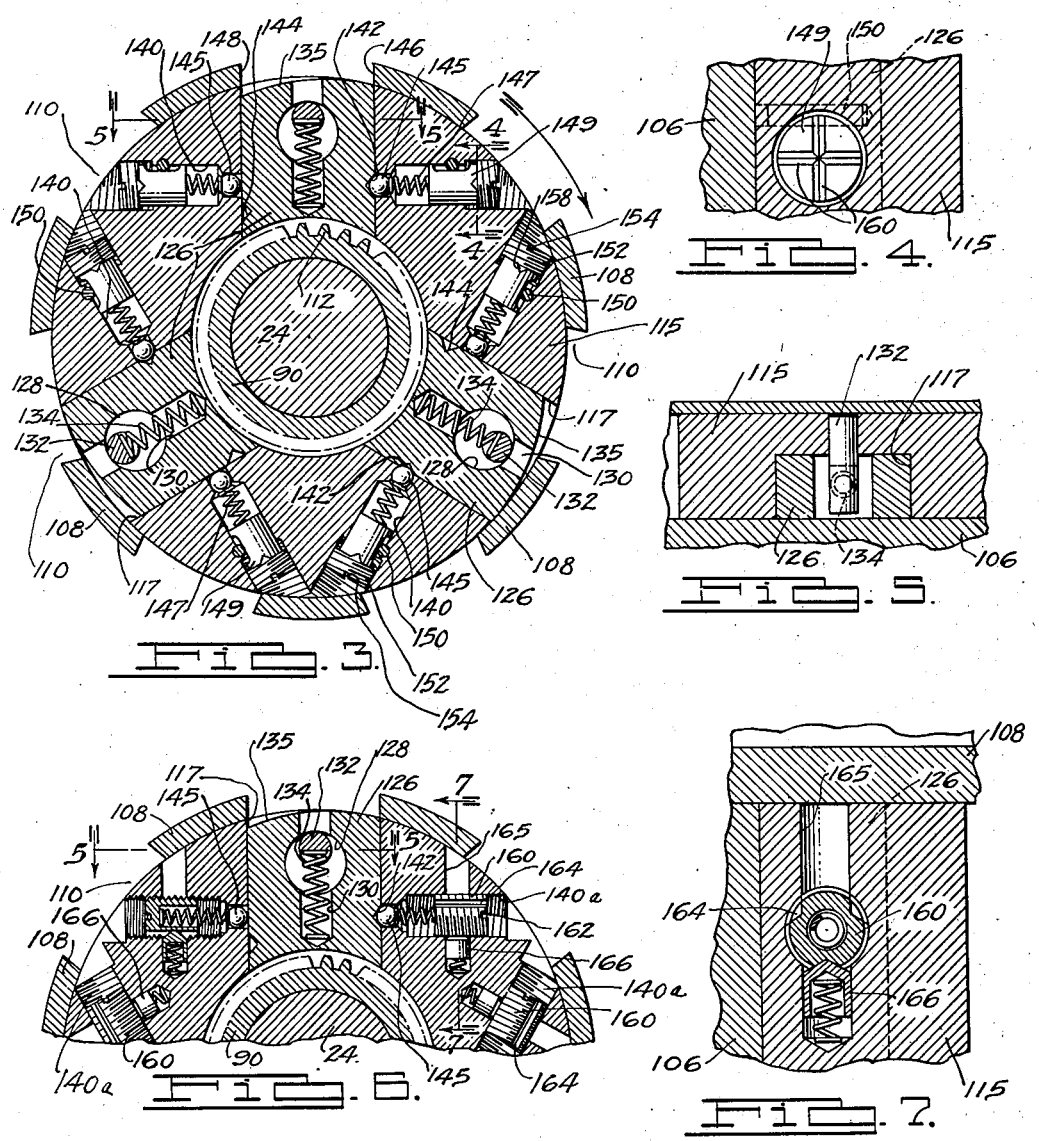
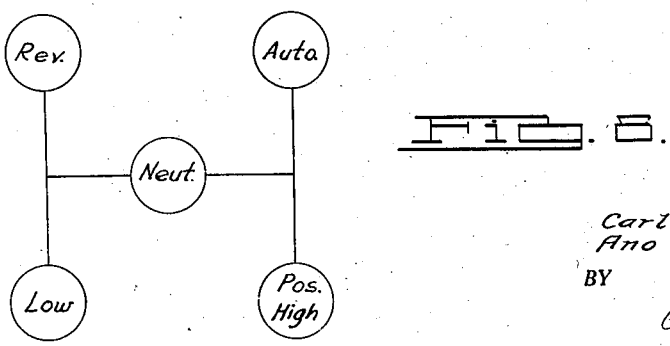
INVENTORS:
Carl F. Rauen,
Ano E. Kilpela.
BY
ATTORNEY.

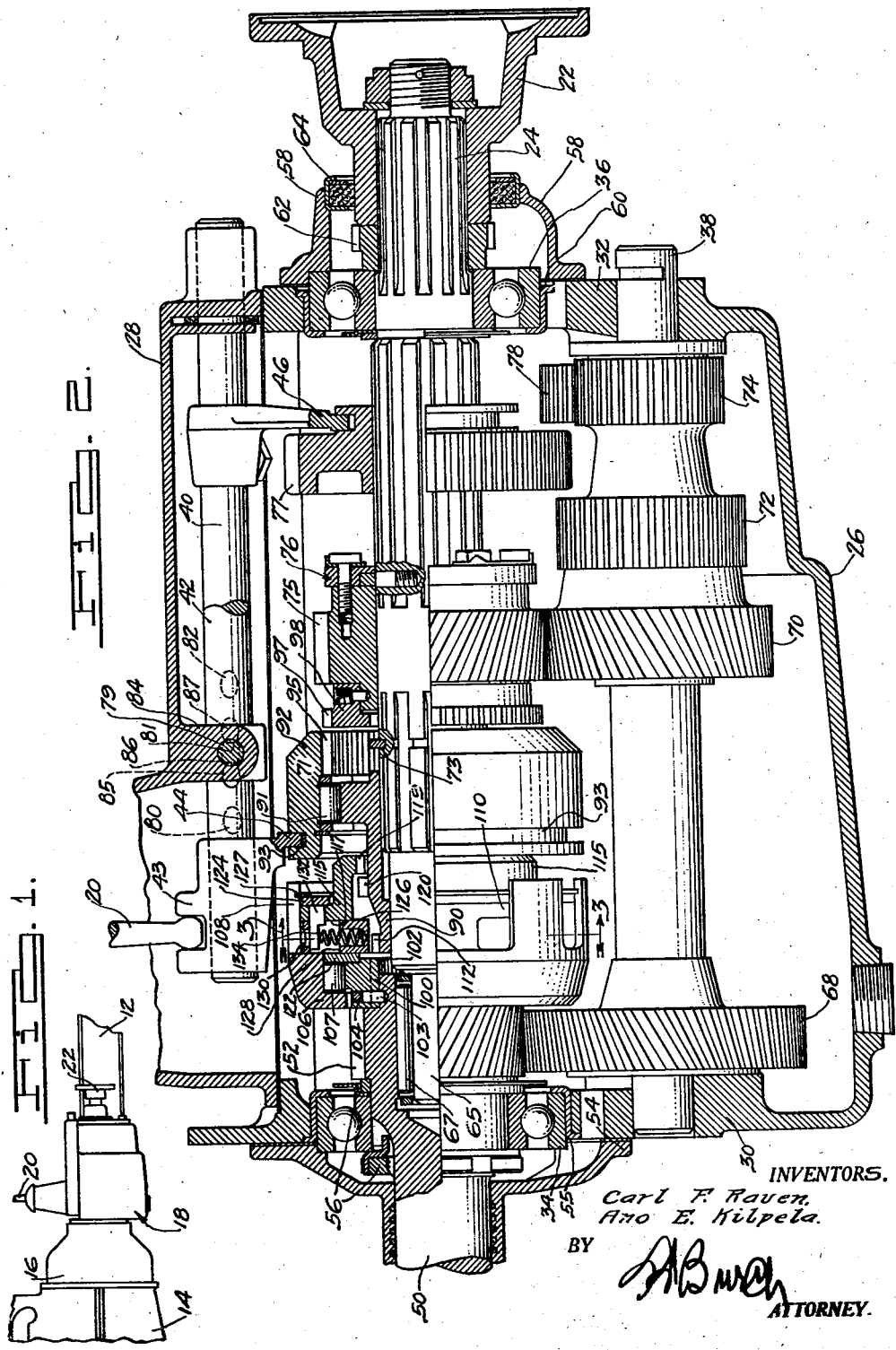

Patented Oct. 25, 1938

2,134,316

UNITED STATES PATENT OFFICE 2,134,316

AUTOMATIC TRANSMISSION

Carl F. Rauen, Grosse Pointe, and Ano E. Kilpela, Detroit, Mich., assignors, by mesne assignments, to Borg-Warner Corporation, a corporation of Illinois Application August 3, 1933, Serial No. 683,450

14 Claims. (Cl. 192—105)

This invention relates to automatic clutches or speed changing mechanisms and particularly to automatic speed changing mechanisms adapted to be incorporated in transmissions such as those used in automotive vehicles and the like. For purposes of illustration, we have disclosed our automatic speed changing mechanism as incorporated in the transmission of an automotive vehicle, but it may be used in other applications if desired. In general, the automatic speed changing mechanism may be said to comprise a driving member having a plurality of slots therein, a driven member having one or more radially movable bolts carried thereby, operable responsive to predetermined speeds of rotation of the driven shaft for interconnecting or disconnecting said members, and means for varying the predetermined speeds at which said bolt is movable to change the driving speed ratio between the driving and driven shafts.

An object of the invention, therefore, is the provision, in an automatic speed changing mechanism, of means for positively interconnecting or disconnecting the driving and driven members at any time after a predetermined speed of rotation of the driven member has been attained and upon deceleration of the speed of rotation of the driving member.

Another object of the invention is the provision of means for eliminating the tendency of the bolt or bolts to "flutter", due to variations in the speed of the driven shaft when the same is rotated at or near the speed at which an automatic change in speed is made.

Another object of the invention is the provision of means having the effect of increasing the starting inertia of the radially movable bolt for building up the pressure tending to move said bolt so that as soon as the starting inertia of the bolt is overcome, it will be snapped into its other position to provide a quick positive change in driving speed ratio.

Another object of the invention is to provide means for varying the predetermined speeds at which said bolt is movable, to change the driving speed ratio between the driving and driven shafts.

Another object of the invention is to provide self-locking means for varying the predetermined speeds at which said bolt is movable, to change the driving speed ratio between the driving and driven shafts, and which may be adjusted without the necessity of disassembling the transmission or automatic speed changing mechanism.

Another object of the invention is to provide means for varying the speed differential between the speeds at which the automatic speed changing mechanism is operable to effect a change in the driving ratio between the driving and driven shafts.

Other objects and advantages will appear from the following description of the invention, with reference to the drawings of which there are two sheets and in which:

Fig. 1 is a view illustrating a transmission embodying our automatic speed changing mechanism as incorporated in an automotive vehicle;

Fig. 2 is a longitudinal view, partly in section, of a transmission having an automatic speed changing mechanism incorporated therein;

Fig. 3 is a vertical cross sectional view of our automatic speed changing mechanism illustrating the details thereof taken on the line 3—3 of Fig. 2 and looking in the direction of the arrows;

Fig. 4 is an enlarged detail sectional view taken on the line 4—4 of Fig. 3;

Fig. 5 is a detail sectional view on the automatic speed changing mechanism taken on the line 5—5 of Figs. 3 and 6;

Fig. 6 illustrates a modified form of an automatic speed changing mechanism;

Fig. 7 illustrates an enlarged detail sectional view of the modification shown in Fig. 6 and taken on the line 7—7 of Fig. 6; and Fig. 8 is a diagrammatic view of the gear positions for the automatic transmission.

Referring to Figs. 1 and 2 of the drawings, there is shown a transmission embodying our automatic speed changing mechanism as incorporated in an automotive vehicle having a main frame 12, an engine 14, and a clutch 16 connected to the transmission indicated generally at 18, a manual shift lever 20 for operating the transmission, and a coupling member 22 carried on the driven shaft 24.

Transmission 18 comprises a case 26, housing the operating mechanism on the transmission and provided with end walls 30 and 32 for supporting the driving and driven shaft bearings 34 and 36, respectively, the countershaft 38 and idler gear shaft (not shown) and a cover plate 28 carrying the yoke rods 40 and 42, shift forks 44 and 46 and shift lever 20. Driving shaft 50 connected to the engine through clutch 16 is journaled in bearing 34 and is formed to provide a helical gear 52 within the case 26. Plate 54 suitably secured exteriorly to the end wall 30 of the case is adapted to cooperate with ring 55 for retaining the bearing 34 in position. Thrust members 56 are provided on the driving shaft 50 on each side of the bearing 34 to take the thrust of the helical gear 52.

Driven shaft 24 is provided with a coupling member 22 splined and bolted thereto for connecting the same through a universal joint connection with a propeller shaft of an automotive vehicle, and is journaled in bearing 36 secured in the end wall 32 of the transmission case by speedometer gear housing 58 and retaining ring 60. A speedometer gear 62 is splined to the driven shaft 24 within the housing 58, which is closed by an oil seal 64 disposed around coupling 22. The forward end of the driven shaft is reduced at 65 and is journaled in a roller bearing 67 disposed in a counterbore in the driving shaft 50.

A cluster of gears 68, 70, 72 and 74 are rotatably mounted on the countershaft 38 which may be locked against rotation by any suitable means. Helical gear 68 is in constant mesh with helical gear 52 for the purpose of rotating the cluster of gears whenever the engine is rotating the driving shaft 50. Helical gear 70 is in constant mesh with a helical gear 75 freely carried on the driven shaft 24 and secured against lateral displacement by a thrust member indicated generally at 76, and is adapted to cooperate with a clutch member 71 for providing an intermediate speed overrunning driving connection between the driving and driven shafts. A gear 77 slidably splined on the driven shaft is adapted to be shifted into engagement with gear 72 on the countershaft to provide a low gear driving speed ratio between the driving and driven shafts, and to be shifted into engagement with idler gear 78, constantly in mesh with gear 74 to provide a reverse driving connection between the driving and driven shafts.

Slidably disposed in the cover plate 78 of the transmission are a plurality of yoke rods 40 and 42 which carry the shift forks 44 and 46, respectively, and each of which is provided with a gate such as 43, adapted to be engaged by the end of the shift lever 20 for the purpose of shifting the gears to effect a change in the driving connection between the driving and driven shafts. Yoke rod 40 is provided with a series of lateral notches 80, 81 and 82, corresponding respectively with the "reverse", "neutral" and "low" positions of the gear 77, adapted to be engaged by a spring pressed poppet such as 79 carried by the boss 84 for the purpose of enabling the operator of the vehicle properly to locate the different positions of the gear 77 and to assist in holding the yoke rod 40 against accidental displacement. Yoke rod 42, partially broken away and disposed in front of yoke rod 40, looking at Fig. 2, is similarly provided with a series of notches 85, 86 and 87, corresponding respectively with the "automatic", "neutral" and "positive high" positions of the clutch member 71, and adapted to be engaged by a spring pressed popet 79 carried by the boss 84 for a purpose similar to that set forth with respect to the notches on the yoke rod 40.

The clutch member 71 may be termed an overrunning or free-wheeling clutch as it is adapted to provide a one-way drive between the helical gear 75 and the driven shaft 24 and comprises a driven member or sleeve 90 slidably splined to the driven shaft, a series of rollers such as 91, carried between radially disposed cammed faces on the sleeve and an annular surface on the driving shell member 92. The driving member 92 is provided with an external annular groove 93 for receiving shift fork 44 and with internal teeth 95 adapted to mesh with external radial teeth 97 on a ring member 98 carried by and locked to the helical gear 75 for providing an intermediate speed free wheeling driving connection between the driving and driven shafts. Movement of the handle of the shift lever 20 to "automatic" position, (see Fig. 8) will shift gate 43 to the right, looking at Fig. 2, until notch 85 on yoke rod 42 comes into engagement with poppet 79 whereby the fork 44 will, through engagement with groove 93 on driving member 92, have moved the same to mesh teeth 95 and 97.

A member 100 having internal teeth 102 adapted to mesh with external teeth 112 carried by the sleeve 90 and rigidly affixed to the end of the driving shaft 50 by a pin 103 and snap ring 104, comprises the driving member of another overrunning or free wheeling clutch disposed on the driving shaft for providing free wheeling in "automatic high gear", which clutch may, however, be omitted if free wheeling in "automatic high gear" is not desired. A shell or driven member 106, adapted to cooperate with a series of rollers 107, each of which rides upon one of a plurality of cammed surfaces radially disposed about the external surface on member 100 provides a one-way drive between driving and driven shafts. The member 106 is provided with a plurality of fingers 108 determining a series of equidistantly spaced slots or engagement portions 110. In this instance the overrunning clutch comprises the driving member of an automatic speed changing mechanism which is adapted to effect an automatic change from "intermediate" to "high" gear, or an automatic change from "high" to "intermediate", responsive to variations in speeds of rotation of the driven member of such automatic speed changing mechanism above and below predetermined or critical speeds and to engine throttle control.

The driven member of the automatic speed changing mechanism comprises a core 115 adapted to rotate within the shell member 106 and provided with one or more radial grooves 117 which may be fewer in number than the slots 110 in the driving member 106, and a set of teeth 119 adapted to mesh with teeth 120 carried by the sleeve 90. A thrust washer 122 disposed between the core 115 and the driving member 100 of the overrunning clutch serves to hold the rollers 107 in position. A thrust washer 124 and snap ring 127 carried by the shell 106 holds the core 115 within the shell against lateral displacement.

In each of the radial grooves 117 there is disposed a slidable bolt 126 having a transverse bore 128 through one end thereof and a longitudinal centrally disposed bore 130. A pin 132 carried by the core 115 projects into the transverse bore 128 in the bolt 126 and is adapted to confine a spring 134 between the ends of the longitudinal bore 130 and a flatted surface of the pin 132 for the purpose of resisting radially outward movement of the bolt 126 under the influence of centrifugal force resulting from rotation of said core.

The bolt is adapted, however, under the influence of centrifugal force resulting from the rotation of the core at or above a predetermined or critical speed, to slide radially outwardly against the tension of spring 132 and, under certain conditions, to project into one of the slots 110 formed between the fingers 108 for the purpose of interconnecting the driving and driven members of the automatic speed changing mechanism to effect an automatic change from "intermediate" to "high" gear ratio between the driving and driven shafts.

Referring now particularly to Figs. 3 to 5 where there are shown cross sectional views of the automatic speed changing mechanism, it will be noted that each of the radially slidable bolts 126 are provided with beveled or tapered faces 135. These faces are beveled so that whenever the shell or driving member carrying the fingers 108 overruns or rotates at a speed in excess of that of the core or driven member carrying the radially movable bolts 126, such bolts cannot fly out of the core and into the slots 110. The relative rotation between the members in the direction of the arrow (Fig. 3) will move one of the fingers 108 over the groove 117 to engage the low side on the beveled surface of the bolt 126 before such bolt has had sufficient time to move radially the distance represented by the difference between the high and low points on the beveled surface of the bolt, after the high point on the beveled surface of the bolt has left the next preceding finger 108.

However, when the speeds of rotation of the shell and core are approximately synchronized and assuming that the core 115 is rotating sufficiently rapid to generate enough centrifugal force to move the bolts 126 radially outwardly against the tension of the spring 134, one of the bolts 126 will be projected into one of the slots 110 so that the shoulder formed by the high point on the beveled surface of such bolt will immediately engage the edge 146 of one of the fingers 108 for the purpose of interconnecting the shell and core. The width of the slots 110 is slightly greater than that of the bolts 126, preferably several thousandths of an inch, in order that the bolts may be projected into the slots when the speed of rotation of the driving member 106 has been relatively reduced approximately to that of the driven member 115 and to permit release of torque between the bolt and the fingers 108 upon reversal of drive between the driving and driven shafts.

The core 115 is provided with a series of bores 140, pairs of which are oppositely disposed perpendicularly to the axis of each of the grooves 117. Each bolt is provided with oppositely disposed offset notches 142 and 144 which are so adapted to coincide with the bores that when the bolt 126 is in its retracted position, one of the bores coincides with the notch 142 and when the bolt is in its protracted position, the other of the bores is adapted to coincide with the notch 144.

Each of said bores is provided with a poppet 145 resiliently held against the bolt 126 by a spring 147 which is backed by an adjustable plug 149. Plug 149 is held against rotation by a pin 150 secured in the core 115 which engages a slotted portion of the plug so as to permit longitudinal movement of the same in the bore 140. A screw 152 having a kerf 154 for engagement by a screw driver, is threadedly secured in an enlarged portion of the bore and is provided with a ridge 158 adapted to engage one of the grooves 160 in the plug 149 for the purpose of holding the screw 152 against undesirable rotation.

The screw 152 may be rotated through 90° or any multiple of 90° to increase or decrease the tension with which the spring engages the poppet 145. Engagement of the poppet in the notches of the radially movable bolts has the effect of increasing the starting inertia of the same and causing the force tending to move the bolt to build up so that when sufficient force exists to overcome the pressure of the poppet, the bolt will be snapped from one of its positions to another.

Adjustment of the poppet spring pressure will change the predetermined or critical speeds at which the bolts are movable from one position to another and will vary the differential between the speeds at which the automatic speed changing mechanism is operable. The centrifugal bolts 126 normally are adapted to be radially projected at a predetermined or critical speed of rotation of the core 115 and to be collapsed or returned at a slightly lower critical speed, due to the shifting of the center of gravity farther from the axis about which it rotates. The poppet engaging the notch 144 has the effect of increasing the tendency of the bolts to collapse or return at a speed lower than that at which they normally would. Thus the poppet engaging the notch 142 may be adjusted to effect an automatic shift from "intermediate" to "high" at any speed, say fifteen miles per hour, and the poppet engaging the notch 144 may be adjusted to effect an automatic shift from "high" to "intermediate" at any critical speed less than that at which the bolts normally would return, say ten miles per hour.

The poppet, engaging the notch 142, and the notch 142, may if desired be omitted for the purpose of eliminating any changing of the critical speed at which the bolts are radially movable into the slots 110, inasmuch as movement of the bolts into the slots can be effectively controlled after the critical speed has been attained by engine throttle control. However, if such poppets and notches are retained, they may be adjusted for increasing the critical speed above that at which the bolts normally would fly out solely against the tension of spring 134. Adjustment of either of the poppets disposed on the opposite sides of the groove will increase the normal differential between the critical speeds at which said bolts are moved outwardly and inwardly.

The modification of the invention illustrated in Figs. 6 and 7 utilizes the same type of bolts and poppets as are used in the preferred form, but provide a different means for adjusting the tension of the poppet springs and locking the same at the desired tension. In Figs. 6 and 7 a threaded plug 160 having a kerf 162 for engagement by a screw driver, is threadedly secured in a bore 140ª and is provided with a series of longitudinally extending grooves 164 in its outer surface. A second bore 165 is provided in the core 115 at right angles to the threaded bore 140ª and has therein bearing against the outer surface of the threaded plug 160, a spring pressed poppet 166 adapted to engage in one of the grooves 164. In this modification, the threaded plug 160 may be rotated through 120°, or any multiple thereof, to increase or decrease the tension with which the spring engages the poppet 145. The poppet 166 will, through engagement with the groove 164, hold the threaded plug against undesirable rotation.

The vehicle may be started in "low" gear by movement of the shift lever 20 to "low" gear position, (see Fig. 8), after the driving connection between the engine and the driving shaft 50 has been broken, such as by operation of the clutch, which movement of the shift lever will shift gear 71 into mesh with gear 72 to provide a driving connection between the shafts through the intermediary of helical gears 52 and 68 and gears 72 and 71. It will be noted that when the transmission is in low gear, the core 115 of the automatic speed changing mechanism will be carried by the driving member 106 on the automatic speed changing mechanism and rotated therewith, but will not be connected to the driven shaft 24.

Movement of the shift lever to "automatic" position (see Fig. 8), will shift gear 77 out of mesh with gear 72 and will subsequently shift yoke rod 42 carrying the shift fork 44 to move clutch member 71 so that the teeth 95 thereof will mesh with teeth 97 on the ring member 98 carried by the helical gear 75. A snap ring 73 secured to the driven shaft 24 is adapted to engage the sleeve 90 of the clutch 71 for limiting movement of the same in one direction. Movement of the clutch 71 to mesh teeth 95 and 97 will move sleeve 90 of the clutch member to mesh teeth 120 carried thereby with teeth 119 carried by the core or driven member 115 of the automatic speed changing mechanism.

When the engine clutch is subsequently engaged, the driven shaft 24 will be driven through the intermediary of helical gears 52, 68, 70 and 75, tooth member 98 and clutch 71 through driven member or sleeve 90 which is splined to the driven shaft. Driven member or core 115 of the automatic speed changing mechanism will be driven with the driven shaft 24 on account of the meshing of teeth 120 and 119. When the driven member or core 115 of the automatic speed changing mechanism is rotating with the driven shaft 24, the driving member 106 carrying the fingers 108 will be rotating at a rate of speed in excess of that of the driven member in the direction of the arrow shown in Fig. 3.

After the speed of rotation of the driven shaft and the driven member of the automatic speed changing mechanism attains a predetermined rate, the bolt 126 will, under the action of centrifugal force, resulting from the rotation of the driven member 115, tend to fly outwardly against the compression of the spring 134 and the pressure of poppet 145 engaging notch 142, but will be prevented from so doing by the relative rotation between the members in the direction of the arrow (Fig. 3) which will move one of the fingers 108 over the groove 117 to engage the low side on the beveled surface of the bolt 126 before such bolt has had sufficient time to move radially the distance represented by the difference between the high and low points on the beveled surfaces of the bolt after the high point on the beveled surface of the bolt has left the next preceding finger 108.

The bolt 126 cannot enter the slot 110 until the speed of rotation of the driving member 106 of the automatic speed changing mechanism has been reduced to the approximate speed of rotation of the driven member of the automatic speed changing mechanism after the driven member has attained the critical speed. This may be accomplished by closing the throttle of the engine momentarily to reduce the speed of rotation of the driving shaft 50. Whenever this action takes place and whenever one of the bolts 126 lines up with one of the slots 110, the shoulder formed at the high point of the beveled surface of the bolt 126 will engage an edge of a finger 108, such as edge 146, for the purpose of preventing further reduction of the speed of rotation of the driving member relative to the driven member and for interconnecting the driving and driven members of the automatic speed changing mechanism. Subsequent acceleration of the speed of rotation of the driving member 106 of the automatic speed changing mechanism will release the torque between the shoulder formed on the high point on the beveled surface of the bolt 126 and the edge 146 and permit the bolt to be projected further within the slot if it has not already reached the limit of its outward movement, so that the shoulder formed by the low point on the beveled surface of the bolt 126 will engage an edge on one of the fingers 108, such as edge 148, for the purpose of rotating the driven member of the automatic speed changing mechanism with the driving member thereof.

This action will effect an automatic shift from "second" to "high" driving speed ratios, and the driven shaft 24 will now be connected to the driving shaft 50 through the intermediary of driving member 100 of the overrunning clutch mechanism, fingers 108, shell 106, bolt 126, core 115, meshing teeth 119 and 120, and sleeve 90 which is splined to the driven shaft 24.

When the transmission is in "automatic high" gear, the overrunning clutch 71 permits the sleeve 90 to rotate with the driven shaft at a faster rate of speed than the shell 92 meshed with tooth member 98 and helical gear 75. The transmission will continue in "automatic high" gear until the tension of the spring 134 is sufficient to overcome the centrifugal force resulting from the rotation of the core 115 and the force with which the poppet 145 engages in the notch 144, and until the torque between the shoulder formed on the low point of the beveled surface of the bolt 126 and the edge 148 of the finger 108 is released, incident to a reduction of the driving power of the shaft 50, such as by closing the engine throttle.

When the tension of the spring 134 is sufficient to move the bolt 126 inwardly, an automatic shift from "high" to "second" will have been effected, and the driven shaft will then be driven through the intermediary described for automatic second gear. The automatic speed changing mechanism can be set to effect the automatic changes in driving ratios at any desired speeds by changing the spring pressure with which the poppet engages the notches in the bolts 126 by adjustment of the plugs 149 or 160 which will vary the force required to move the bolts radially outwardly and/or inwardly.

Teeth 102 on the driving member 100 carried by the driving shaft 50 are adapted to be meshed with teeth 112 on the sleeve 90 for locking out the overrunning clutch and automatic speed changing mechanism and to provide a positive drive in high gear between the driving and driven shafts. This may be accomplished by manipulating the shift lever 20 to positive "high" position from either automatic second or automatic high position which will have the effect of shifting overrunning clutch member 71 and sleeve 90 until the teeth 112 carried thereby are meshed with the teeth 102, when the driving connection will be through member 100, teeth 102 and 112 and sleeve 90, which is splined to the driven shaft 24.

As illustrated, the driving member or shell of the automatic speed changing mechanism is provided with seven slots, equidistantly placed on the periphery thereof and the driven member or core of the automatic speed changing mechanism is provided with three radially movable bolts. It will be appreciated, therefore, that only one of the bolts at any one time can engage in any one of the slots on the driving member because of the spacing of the bolts relative to the spacing of the slots. The object of using a number of slots different from the number of bolts is for the purpose of reducing the maximum circumferential travel that may be necessary before one of the bolts lines up with one of the slots. A greater or lesser number of slots in the driving member and bolts in the driven member may be used so long as no more than one bolt at any one time is capable of engaging any one of the slots in the driving member. For this purpose the core may be provided with any desirable number of bolts as well as may the driving member of the automatic speed changing mechanism.

While several specific embodiments of our automatic speed changing mechanism have been illustrated and described, it must be appreciated that many modifications may be made in the construction of the details thereof without departing from the scope of the invention, and for that reason we do not desire to be limited to any particular form or arrangement except in so far as such limitations are included in the following claims.

We claim:

1. Transmission mechanism comprising a pair of members adapted to be connected for rotation together and initially driven at different rates, one of said members being provided with a bolt engaging recess and the other of said members constituting a centrifugally operable clutch member comprising a core having a plurality of radially disposed grooves, a centrifugally operable bolt for each of said grooves and provided with an aperture between the faces thereof, said centrifugally operable bolt being movable into said recess for connecting said members together, a pin carried by said core and projecting into said aperture, and a spring disposed between said pin and said bolt and tending to oppose movement of said bolt under the action of centrifugal force resulting from rotation of said core.

2. Transmission mechanism comprising a pair of members adapted to be connected for rotation together and initially driven at different rates, one of said members being provided with a bolt engaging recess and the other of said members constituting a centrifugally operable clutch member comprising a core having a radially disposed groove, a bolt provided with a transverse opening and disposed in said groove and movable in one direction responsive to centrifugal force resulting from rotation of said core for operatively engaging said recess for connecting said clutch members together, a pin carried by said core and extending into said opening, and resilient means disposed between said pin and said bolt for moving the same in a direction opposite to that in which the bolt is moved responsive to centrifugal force.

3. Transmission mechanism comprising a pair of members adapted to be connected for rotation together and initially driven at different rates, one of said members being provided with a bolt engaging recess and the other of said members constituting a centrifugally operable clutch member comprising a core having a radial groove, a bolt provided with a transverse opening and disposed in said groove and movable in one direction into said recess for connecting said clutch members together responsive to centrifugal force resulting from rotation of said core, a pin carried by said core and extending into said opening, a spring disposed between said pin and said bolt and tending to oppose movement of said bolt under the action of centrifugal force, said bolt being provided with notches on opposite sides thereof, and oppositely disposed poppets carried by said core and adapted to engage with the notches on said bolt for resisting movement of the same.

4. Transmission mechanism comprising a pair of members adapted to be connected for rotation together and initially driven at different rates, one of said members being provided with a bolt-engaging recess and the other of said members having associated therewith a centrifugally operable bolt movable into said recess and having an opening therein, a pin carried by said last mentioned member and extending into said opening, spring means associated with said pin and operable for moving said bolt out of said recess, and means operable for preventing the movement of said bolt into said recess until the rotative speed of said members has been substantially synchronized.

5. Transmission mechanism comprising a pair of members adapted to be connected for rotation together and initially driven at different rates, one of said members being provided with a bolt-engaging recess and the other of said members having associated therewith a centrifugally operable bolt movable into said recess and having an opening therein, a pin carried by said last mentioned member and extending into said opening, spring means associated with said pin and operable for moving said bolt out of said recess, means operable for preventing the movement of said bolt into said recess until the rotative speed of said members has been substantially synchronized, and adjustable means operable for opposing only the initial movement of said bolt into and out of said recess.

6. Transmission mechanism comprising a pair of members adapted to be connected for rotation together and initially driven at different rates, one of said members constituting a drum-shaped clutch member and provided with a plurality of annularly spaced openings, the other of said members constituting a core clutch member having a radial groove and nested within said drum-shaped clutch member, a bolt provided with a transverse opening slidably disposed in said groove and movable in one direction responsive to centrifugal force resulting from rotation of said core to extend into one of said slotted openings in said drum-shaped clutch member for connecting the same with said core clutch member, a pin carried by said core and extending into said opening, a spring disposed between said pin and said bolt and opposing movement of said bolt under the action of centrifugal force, said bolt being provided with notches on opposite sides thereof, oppositely disposed poppets carried by said core and engageable with said notches for resisting movement of said bolt under the influence of centrifugal force and of said spring, and means for holding said bolt out of said slotted openings until the rotative speeds of said clutch members have been substantially synchronized.

7. Transmission mechanism comprising a pair of members adapted to be connected for rotation together and initially driven at different rates, one of said members constituting a drum clutch member having a plurality of slots disposed about the face thereof the other of said members constituting a core clutch member adapted to be connected to said drum clutch member and having a plurality of centrifugally movable bolts extensible into said slots, there being a different number of bolts on said core member than slots in said drum member so that the circumferential distance between those positions where a bolt is in alignment with a slot for extension thereinto is less than the distance between adjacent bolts, and means for holding said bolts out of said slots until the rotative speeds of said members have first been substantially synchronized.

8. Transmission mechanism comprising a pair of members adapted to be connected for rotation together and initially driven at different rates, one of said members constituting a drum-shaped member having a plurality of bolt-receiving recesses equidistantly spaced about the periphery thereof, the other of said members constituting a core nested within said drum-shaped member and having a plurality of radially disposed grooves, there being a lesser number of grooves in the core member than recesses in said drum member, each of said grooves being provided with a centrifugally operable bolt, only one of which at a time may be projected into any one of said recesses for interlocking said drum and core members, each of said bolts being provided with a plurality of notches on the sides thereof, poppets engageable with said notches on said bolts for restraining movement of the same from one position to another, and means for holding said bolts out of said recesses until the rotative speeds of said members have been substantially synchronized.

9. Transmission mechanism comprising a pair of members adapted to be connected for rotation together and initially driven at different rates, one of said members constituting a drum-shaped member having a bolt-receiving recess, the other of said members constituting a core member having a radially extending groove, a bolt provided with a transverse opening and disposed in said groove and movable in one direction responsive to centrifugal force to project into said recess for interconnecting said members, a pin carried by said core member and extending into said opening, resilient means disposed between said pin and said bolt for moving the same in a direction opposite to that in which the bolt is moved responsive to centrifugal force for disconnecting said members, and means for holding said bolt out of said recess until the rotative speeds of said members have been substantially synchronized.

10. Transmission mechanism comprising a pair of clutch elements adapted to be connected for rotation together and initially driven at different rates, one of said elements constituting a drum having a series of slots therein, the other of said elements constituting a core member having a radial groove, a bolt member disposed in said groove and movable in one direction responsive to centrifugal force to engage in one of said slots for interlocking said core member with said drum, an opening in one of said members, a pin carried by the other of said members and extending into said opening, a spring disposed in said opening between said pin and said member in which said opening is provided and opposing movement of said bolt member under the action of centrifugal force, one of said members being provided with notches in the sides thereof, poppets carried by the other of said members engageable with said notches for restraining movement of said bolt from one of its positions to the other, and means for holding said bolt member out of said slots until the rotative speeds of said core member and said drum have been substantially synchronized.

11. Transmission mechanism comprising a pair of members adapted to be connected for rotation together and initially driven at different rates, one of said members constituting a drum-shaped member having a plurality of slots equidistantly spaced about the periphery thereof, the other of said members constituting a core member nested within said drum-shaped member and having one or more grooves, there being a different number of grooves in the core member than slots in said drum member so that the distance between adjacent grooves is different than that between adjacent slots, each of said grooves being provided with a centrifugally operable bolt movable into any one of said slots for interconnecting said drum and core members, and means for holding said bolt out of said slots until the rotative speeds of said members have been substantially synchronized.

12. Transmission mechanism comprising a pair of members adapted to be connected for rotation together and initially driven at different rates, one of said members being provided with a bolt engaging recess and the other of said members constituting a clutch member comprising a body provided with a centrifugally operable element, an opening in said element, a pin carried by said body and extending into said opening, spring means associated with said pin and tending to oppose movement of said element under the action of centrifugal force resulting from rotation of said body, and means on said element and said body and operable for opposing only the initial movement of said element, said element being movable into said recess for connecting said clutch members together.

13. In a device of the class described, the combination of a pair of members adapted to be connected for rotation together and initially driven at different rates, one of said members being provided with a plurality of engagement portions thereon, the other of said members being provided with a different number of connecting elements, one of said connecting elements being operatively engageable with one of said engagement portions for interconnecting said members, and means operable for preventing engagement of any one of said connecting elements with any one of said portions until the rotative speeds of said members are substantially synchronous.

14. Transmission mechanism comprising a pair of members adapted to be connected for rotation together and initially driven at different rates, one of said members being provided with a bolt engaging recess and the other of said members constituting a clutch member comprising a body having a centrifugally operable bolt carried thereby, an opening in said bolt, a pin carried by said body and extending into said opening, spring means associated with said pin and tending to oppose movement of said bolt under the action of centrifugal force resulting from the rotation of said clutch member, said bolt being movable into said recess responsive to centrifugal force for connecting said clutch members together, and means operatively associated with said body and said bolt and operable for opposing only the initial movement of said bolt in response to centrifugal force.

CARL F. RAUEN.
ANO E. KILPELA.